United States Patent [19]

Lebkuchner

[11] Patent Number: 5,529,282
[45] Date of Patent: Jun. 25, 1996

[54] VALVE ACTUATING DEVICE OF A HEATING AND/OR COOLING SYSTEM

[75] Inventor: Benno Lebkuchner, Warwick, R.I.

[73] Assignee: Sparco Inc., Warwick, R.I.

[21] Appl. No.: 405,999

[22] Filed: Mar. 17, 1995

[51] Int. Cl.$^6$ ............................. F16K 31/04; F16K 31/54
[52] U.S. Cl. ................. 251/129.12; 251/129.11; 251/250
[58] Field of Search ................ 251/129.11, 129.12, 251/250, 337

[56] References Cited

U.S. PATENT DOCUMENTS

| | | | |
|---|---|---|---|
| 1,788,429 | 1/1931 | Groble | 251/250 X |
| 3,703,673 | 11/1972 | Balz | 251/129.12 X |
| 4,629,157 | 12/1986 | Tsuchiya et al. | 251/250 X |
| 4,836,497 | 6/1989 | Beeson | 251/250 X |
| 4,845,416 | 7/1989 | Scholl et al. | 251/129.11 X |
| 4,951,915 | 8/1990 | Piao | 251/129.12 X |

*Primary Examiner*—Hoang Nguyen
*Attorney, Agent, or Firm*—Salter & Michaelson

[57] ABSTRACT

A valve actuating device of a heating and/or cooling system controls the opening and closing of a valve of the system. The device includes a housing having a fitting which is threadably received by a fitting receiving formation of the valve for securing the housing to the valve. The device further includes an electric motor mounted on the housing. The motor drives a shaft having a pinion gear mounted thereon, and, upon its activation, opens the valve. A rack has teeth engagable with the pinion gear of the electric motor and an end portion engagable with a valve stem of the valve. The arrangement is such that the rack is movable upon activation of the motor from a first position in which the end portion of the rack engages the valve stem for maintaining a valve member of the valve in a closed position, to a second position in which the rack is moved via the pinion gear of the motor away from the valve stem for opening the valve.

20 Claims, 7 Drawing Sheets

VALVE ACTUATING DEVICE OF A HEATING AND/OR COOLING SYSTEM

BACKGROUND AND SUMMARY OF THE INVENTION

This invention relates generally to valves and more particularly to a valve actuating device of a zone heating and/or cooling system which controls a valve for delivering hot or cool fluid to a zone of the system.

In zone heating and/or cooling systems, valves are provided for controlling the flow of heated or cooled fluid (e.g., water or coolant) to the zones they service. One type of valve well-known in the heating and cooling industry is a heat motor type valve which utilizes wax as a pressure medium for opening and closing a valve member. More particularly, wax, in its hardened state, is softened by suitable heating means for moving the valve member of the valve from its closed to its opened position. This type of valve is desirous in circumstances where the valve needs to be opened slowly to prevent water hammer in the system. Water hammer is defined as the change in pressure in closed conduits caused by sudden changes in velocity of flow (e.g., opening or closing a valve too quickly in a system). However, the heat motor valve suffers from the limitation that it takes too long to heat the wax and therefore too long to open and close the valve member. Typically, such a valve takes approximately four minutes to open and six minutes to close. Contractors installing a heating and/or cooling system find the waiting period between the opening and closing of the valve too long to adequately test the valve after it has been installed in the system. Although the performance of such valves is not suspect, this waiting period causes many contractors to avoid using it.

As an alternative to the heat motor type valve, another valve available to contractors is actuated by a solenoid switch which immediately introduces or cuts-off fluid to the system. However, this valve has been known to cause water hammer since it opens and closes the valve too quickly.

Accordingly, among the several objects of the present invention are the provision of a valve actuating device for opening and closing a valve of a zone heating and/or cooling system, the device opening and closing the valve in approximately ten to twelve seconds; the provision of such a device which substantially eliminates water hammer; the provision of such a device which is easy to assemble in that it requires only minimal fasteners and can be assembled by hand and with a screwdriver; the provision of such a device having a linear design which provides strength and durability unlike designs utilizing linkages; the provision of such a device which may be quickly and easily replaced in existing systems; the provision of such a device which has a manual opening feature; the provision of such a device which operates quietly; the provision of such a device which can be applied to valves having large flow capacities; the provision of such a device which can operate on 0.25 amps for a 24 volt motor; the provision of such a device which is compatible with electronic thermostats; and the provision of such a device which is simple in design and economical to manufacture.

In general, the present invention is directed to a valve actuating device for opening and closing a valve connected to an inlet pipe and an outlet pipe of a zone heating and/or cooling system. The valve comprises a valve housing having an inlet which is connected to the inlet pipe, an outlet which is connected to the outlet pipe, a fitting receiving formation with an opening formed therein, and a valve seat disposed between the inlet and the outlet. A valve member, sealingly engagable with the valve seat, is attached to a valve stem which moves the valve member between a closed position in which the valve member sealingly engages the valve seat for blocking the flow of fluid from the inlet to the outlet and an open position in which the valve member is spaced from the valve seat for allowing fluid to pass from the inlet to the outlet. The valve stem is biased by valve stem biasing means to its open position and is extendable through the opening of the fitting receiving formation.

The valve actuating device of the present invention comprises a housing having a fitting which is threadably received by the fitting receiving formation of the valve for securing the housing to the valve. The device further includes an electric motor mounted on the housing, the motor being adapted to drive a shaft having a pinion gear upon its activation for opening the valve. A rack has teeth engagable with the pinion gear of the electric motor and an end portion engagable with the valve stem of the valve. The arrangement is such that the rack is movable upon activation of the motor from a first position in which the end portion of the rack engages the valve stem for maintaining the valve stem in its closed position against the bias of the valve stem biasing means, to a second position in which, upon activation of the motor, the rack is moved via the pinion gear of the motor away from the valve stem thereby enabling the valve stem biasing means to move the valve member to its open position. Means is provided for biasing the rack to its first position. More particularly, the biasing means comprises a cross member integrally formed with an end of the rack opposite the end portion engaging the valve stem, and a plate mounted on the housing. A pair of springs are attached to the cross member and the plate for biasing the rack to its first position.

Other objects, features and advantages of the invention shall become apparent as the description thereof proceeds when considered in connection with the accompanying illustrative drawings.

BRIEF DESCRIPTION OF THE DRAWINGS

In the drawings which illustrate the best mode presently contemplated for carrying out the present invention.

DETAILED DESCRIPTION OF THE PREFERRED EMBODIMENT

Figure 1:
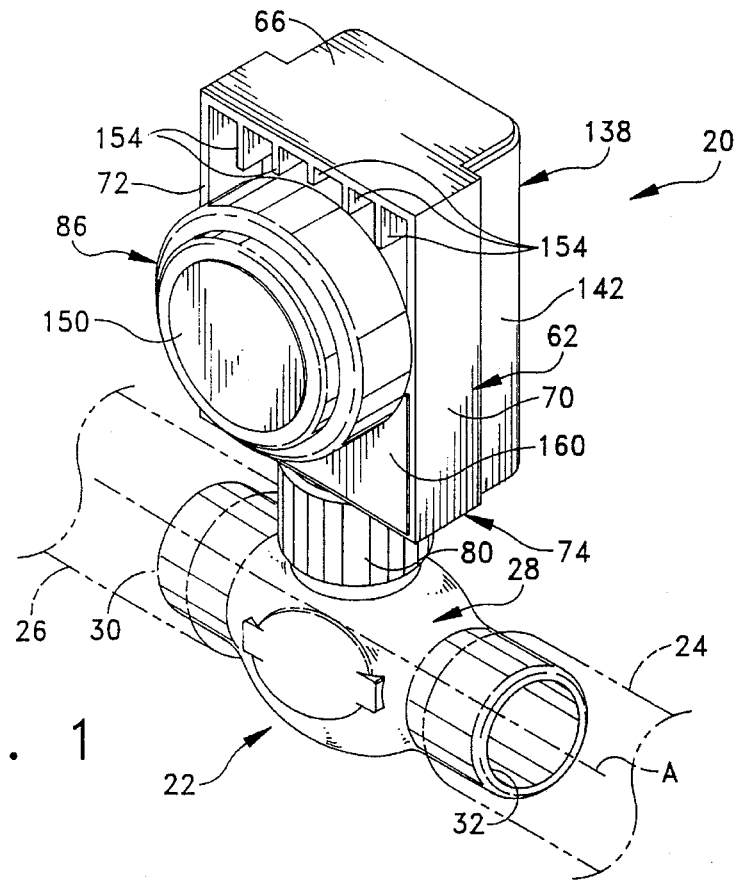
FIG. 1 is a front perspective view of a valve actuating device of the present invention, the device being threadably secured to a plunger-type valve.
Figure 2:
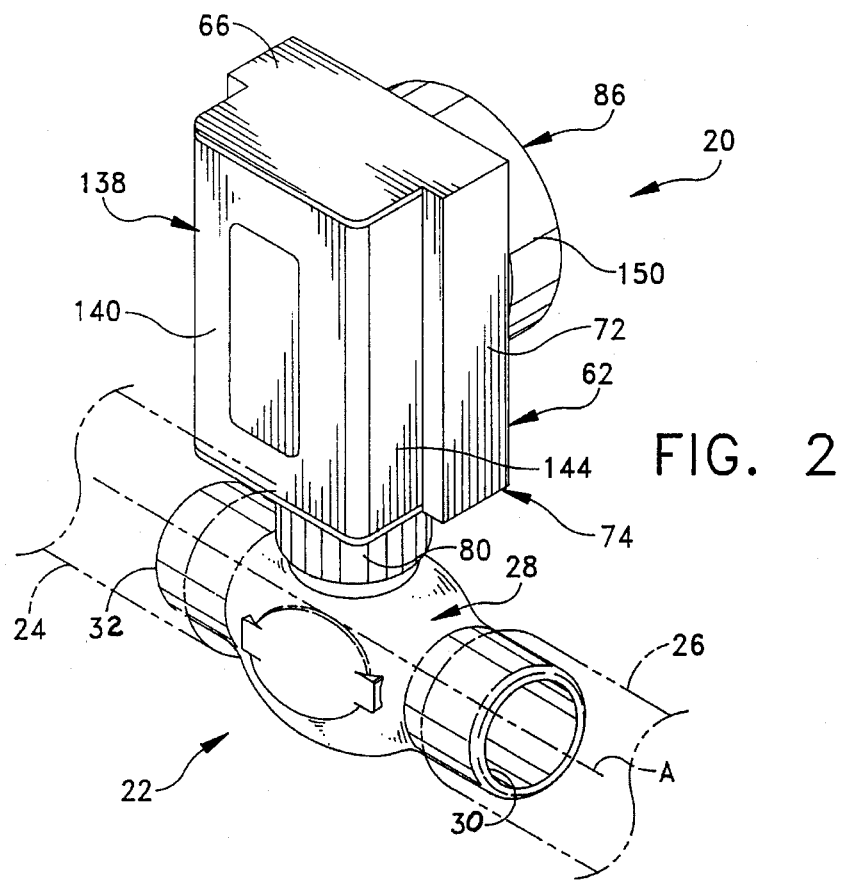
FIG. 2 is a rear perspective view thereof.

Referring to the drawings, and to FIGS. 1 and 2 in particular, there is generally indicated at 20 a valve actuating device for opening and closing a valve, generally indicated at 22. The valve 22 is part of a zone heating and/or cooling system having an inlet pipe 24 and an outlet pipe 26, both illustrated in broken lines in FIGS. 1 and 2, for connecting the valve 22 to the system. The valve actuating device 20 of the present invention is especially suited for delivering fluid (e.g., water or coolant) to a zone of the system when called upon at an opening and closing rate which does not cause water hammer and which is not excessively slow. The valve actuating device 20 is preferably designed to open the valve 22 in approximately ten to twelve seconds and to close the valve 22 in ten to twelve seconds, however, these times can be adjusted to be longer if required.

Figure 3:
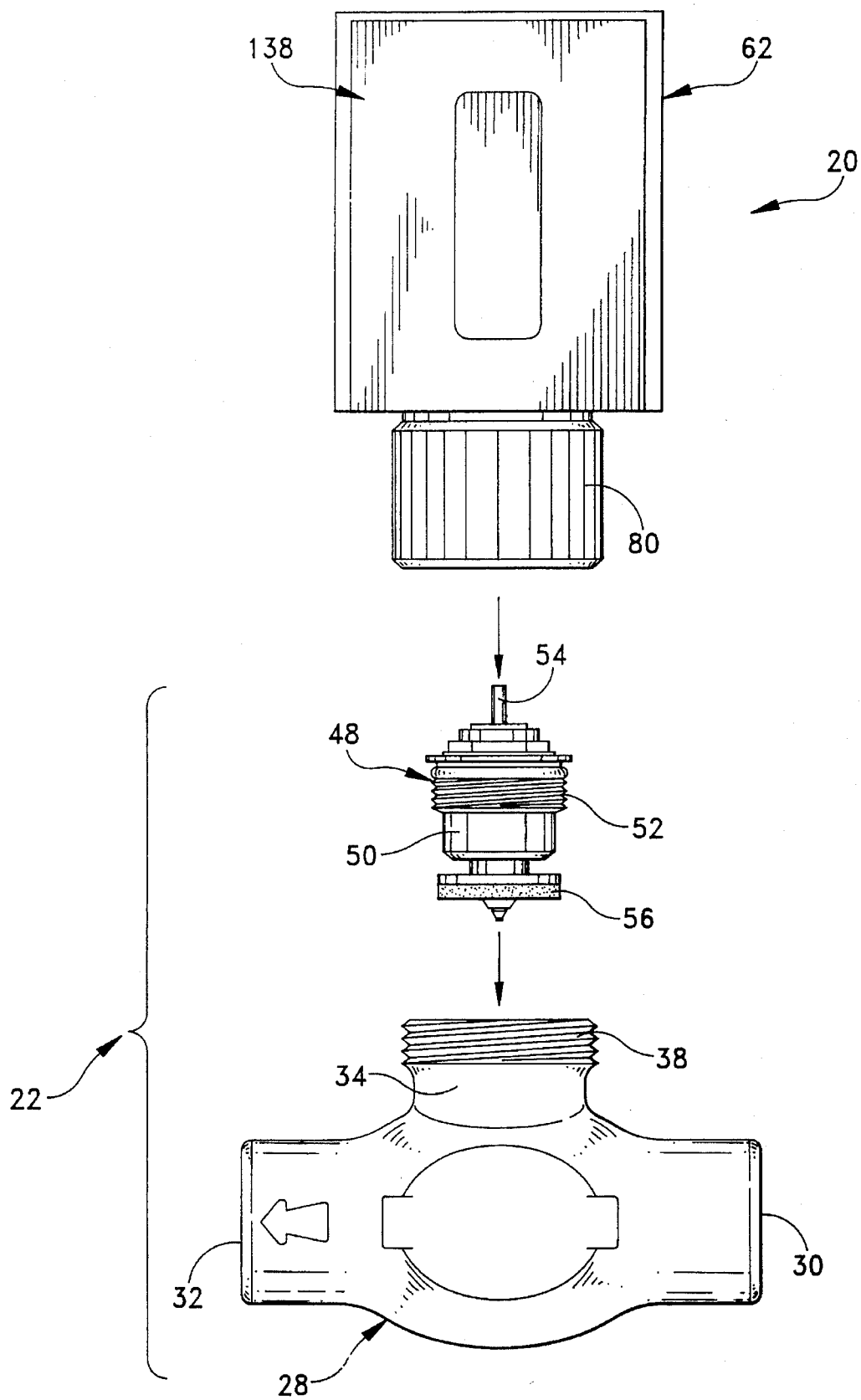
FIG. 3 is an exploded rear elevational view of a valve member and stem arrangement of the valve and the manner upon which the valve is secured to the valve actuating device.
Figure 4:
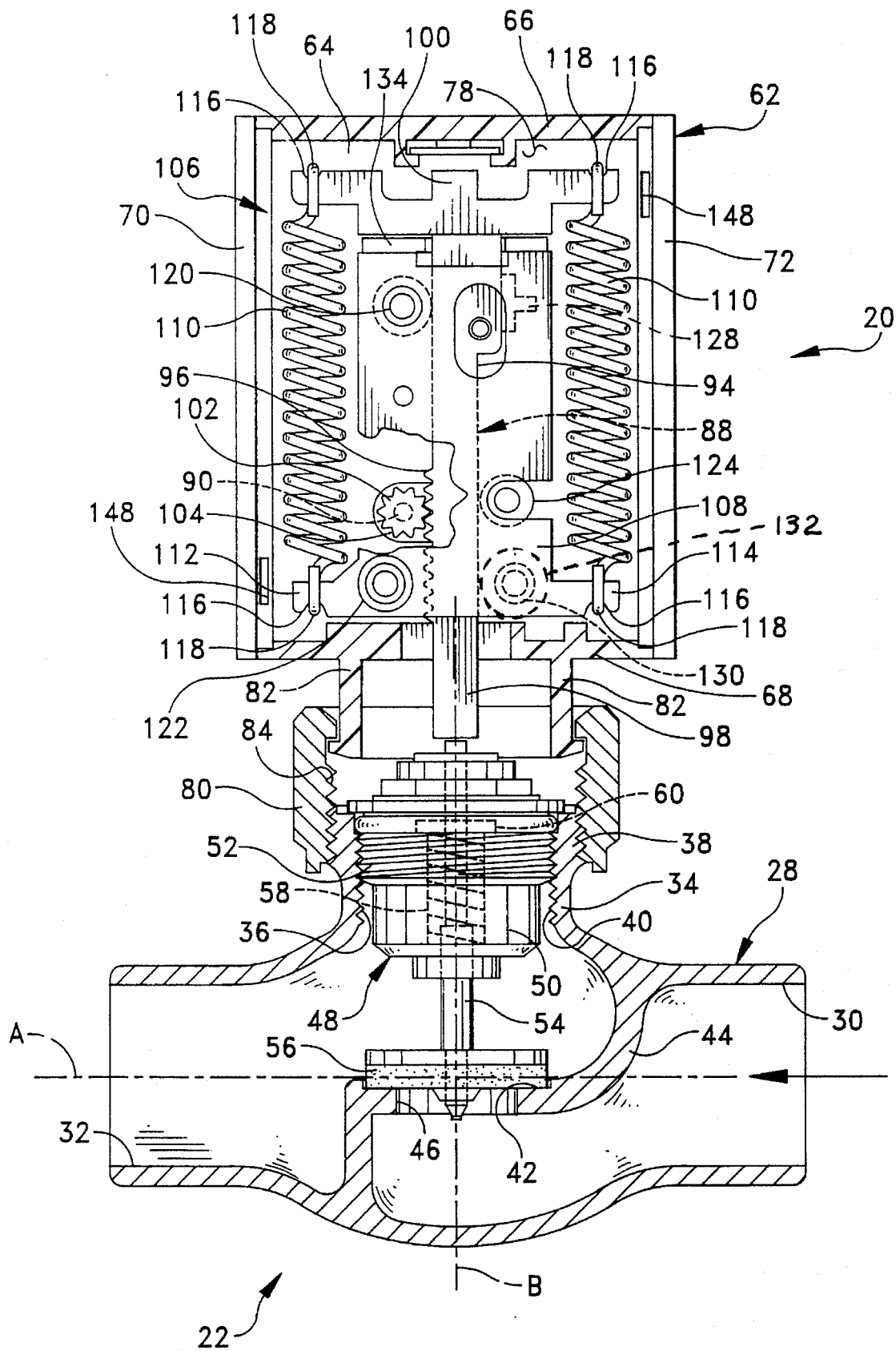
FIG. 4 is a cross section, elevational view of the valve actuating device and the valve with the valve being illustrated in a closed position.
Figure 5:
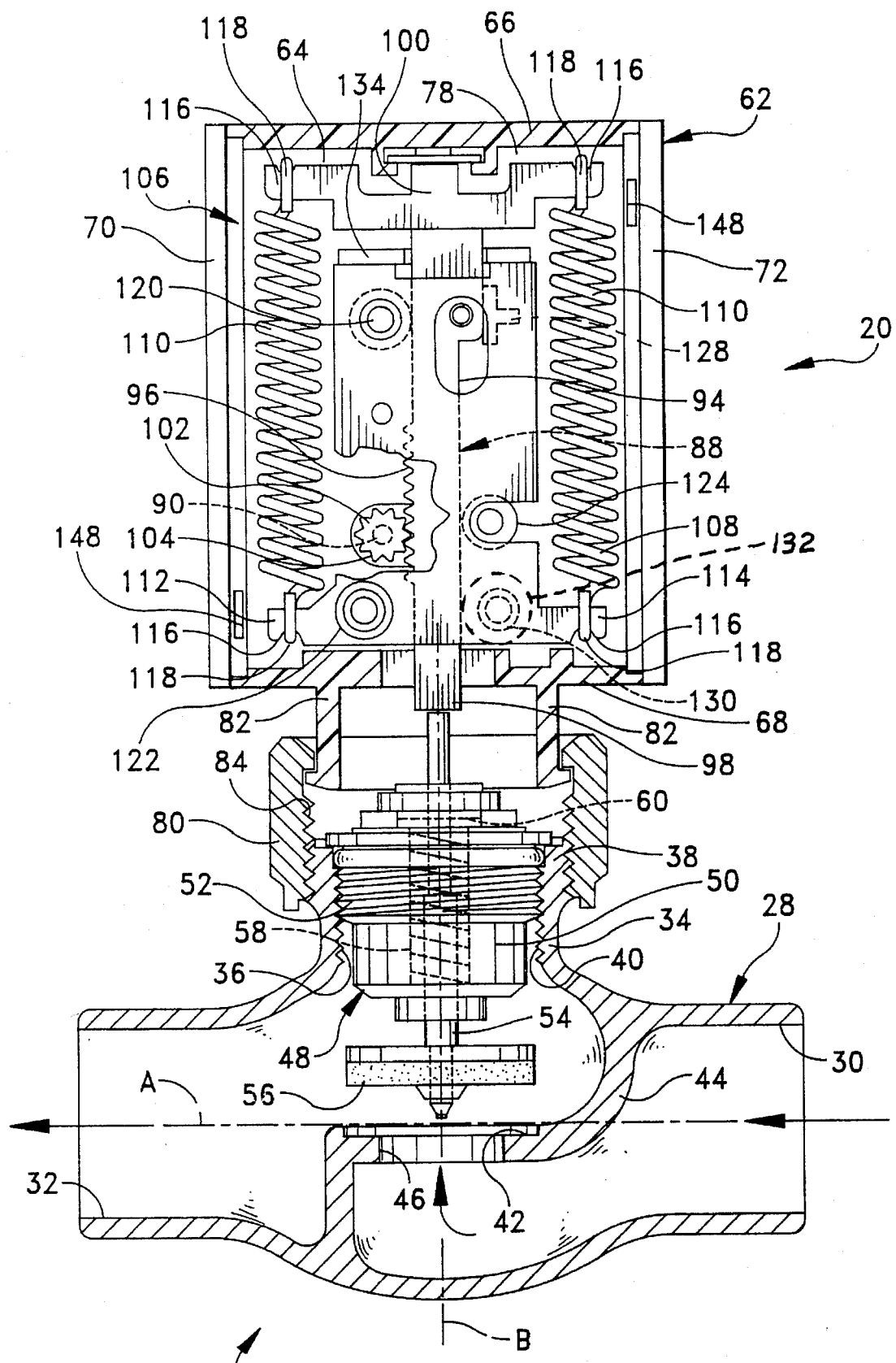
FIG. 5 is a view similar to FIG. 4 with the valve being illustrated in an open position.

Referring to FIGS. 3–5, the valve 22 of the present invention is a standard globe valve which is often found in such systems. As illustrated, the valve 22 comprises a valve housing, generally indicated at 28, which is preferably fabricated from cast bronze. The valve housing 28 has an inlet 30 which is suitably connected to the inlet pipe 24 (e.g., soldering) and an outlet 32 which is connected to the outlet pipe 26 in an identical manner. The inlet 30 and outlet 32 can have any number of diameters depending on the amount of fluid to be delivered to the zone of the system. The valve housing 28 also includes a fitting receiving formation 34 with an opening 36 formed therein which extends along an axis B generally transverse to an axis A which extends between the inlet 30 and outlet 32. As illustrated, the fitting receiving formation 34 has male threads 38 formed on its outer surface and female threads 40 formed on the inner surface within the opening 36. The valve housing 28 is provided with a valve seat 42 formed in a wall 44 which extends between the inlet 30 and the outlet 32. The valve seat 42 has an opening 46 formed therein which allows fluid to pass from the inlet 30 to the outlet 32.

The valve 22 further includes a plunger valve member assembly, generally indicated at 48, which includes a brass fitting 50 having male threads 52 formed on an outer surface thereof for threadably engaging the female threads 40 of the fitting receiving formation 34. The brass fitting 50 of the assembly houses a valve stem 54 which is axially movable in an up-and-down direction along axis B. At the lower end of the valve stem 54 is a valve member 56 fabricated from any suitable elastomeric material for sealingly engaging the valve seat 42 of the valve housing 28. The valve member 56 is circular in plan view and shaped for fully and sealingly engaging the valve seat 42 for blocking the opening 46 formed in wall 44. The valve stem 54 can be moved axially along axis B for moving the valve member 56 between a closed position in which the valve member 56 sealingly engages the valve seat 42 for blocking the flow of fluid from the inlet to the outlet (FIG. 4) through opening 46 and an open position in which the valve member 56 is spaced from the valve seat 42 (FIG. 5) for allowing fluid to pass from the inlet to the outlet through opening 46. The valve stem 54 is biased by valve stem biasing means comprising a spring 58 (illustrated in broken lines in FIGS. 4 and 5) to its open position. More particularly, an annular member 60 (also illustrated in broken lines in FIGS. 4 and 5), fixedly attached to the valve stem 54, is engaged by the spring 58 to bias the valve stem 54 upwardly so that the valve member 56 is sufficiently spaced away from the valve seat 54 to allow fluid to pass from the inlet 30, through opening 46, and to the outlet 32 as illustrated in FIG. 5.

The valve 22 described to this point is of the type well-known in the art of valves and may embody any number of constructions and still fall within the scope of the present invention.

Referring now to FIGS. 4–6 and 8, the valve actuating device 20 comprises a housing, generally indicated at 62, having a vertically disposed interior wall 64, a horizontally disposed top wall 66, a horizontally disposed bottom wall 68 and two vertically disposed side walls 70, 72 which together with the top and bottom walls 66, 68 constitute an outer peripheral wall generally designated 74 which extends outwardly away from a first surface 76 (see FIGS. 7 and 8) of the interior wall 64 at its periphery. The top and bottom walls 66, 68 also extend outwardly away from a second surface 78 of the interior wall 64 which faces in an opposite direction from the first surface 76. Preferably, the housing 62 is fabricated from rigid plastic and may be formed by any suitable process.

The housing further includes a fitting or collar 80 attached to the bottom wall 68 by a plurality of retaining members 82 which extend downwardly from the bottom wall 68 of the housing 62. The collar 80 has internal threads 84 which, when securing the valve actuating device 20 to the valve 22, threadably engage the outer threads 38 of the fitting receiving formation 34 of the valve housing 28. When assembled, the device 20 and valve 22 assume the configuration illustrated in FIGS. 1 and 2.

A motor, generally designated 86, is mounted on the first surface 76 of the interior wall 64 of the housing 62. The motor 86 is provided for upwardly moving a T-shaped rack, generally indicated at 88, which engages the valve stem 54 of the valve 22 for moving the valve member 56 between its opened and closed positions. More particularly, the motor 86 is an electric motor having a shaft 90 which extends through an opening 92 formed in the interior wall 64. The rack 88 includes a bar 94 having teeth 96 formed on one of its sides and an end portion 98 engageable with the valve stem 54 of the valve 22. The rack 88 further includes a cross member 100 integrally formed with the bar 94 at its end opposite the end portion 98. Preferably, the rack 88 is fabricated from steel.

At the outer end of the shaft 90 of the motor 86 is a pinion gear 102 having teeth 104 which meshes with the teeth 96 of the rack 88 for moving the rack 88 along axis B. As shown, when the valve actuating device 20 is attached to the valve 22, the end portion 98 of the rack 88 engages the valve stem 54 of the valve 22 for maintaining the valve member 56 in its closed position. The arrangement is such that the rack 88 is movable upon activation of the motor 86 from a lower first position in which the end portion 98 of the rack 88 engages the valve stem 54 for maintaining the valve member 56 in its closed position against the bias of spring 58 (see FIG. 4), to an upper second position in which the rack 88 is moved away from the valve stem 54 thereby enabling the spring 58 to move the valve stem 54 to its open position (see FIG. 5). This is accomplished by activating the motor 86 which rotates the pinion gear 102 counterclockwise for linearly driving the rack 88 upwardly along axis B.

Figure 6:
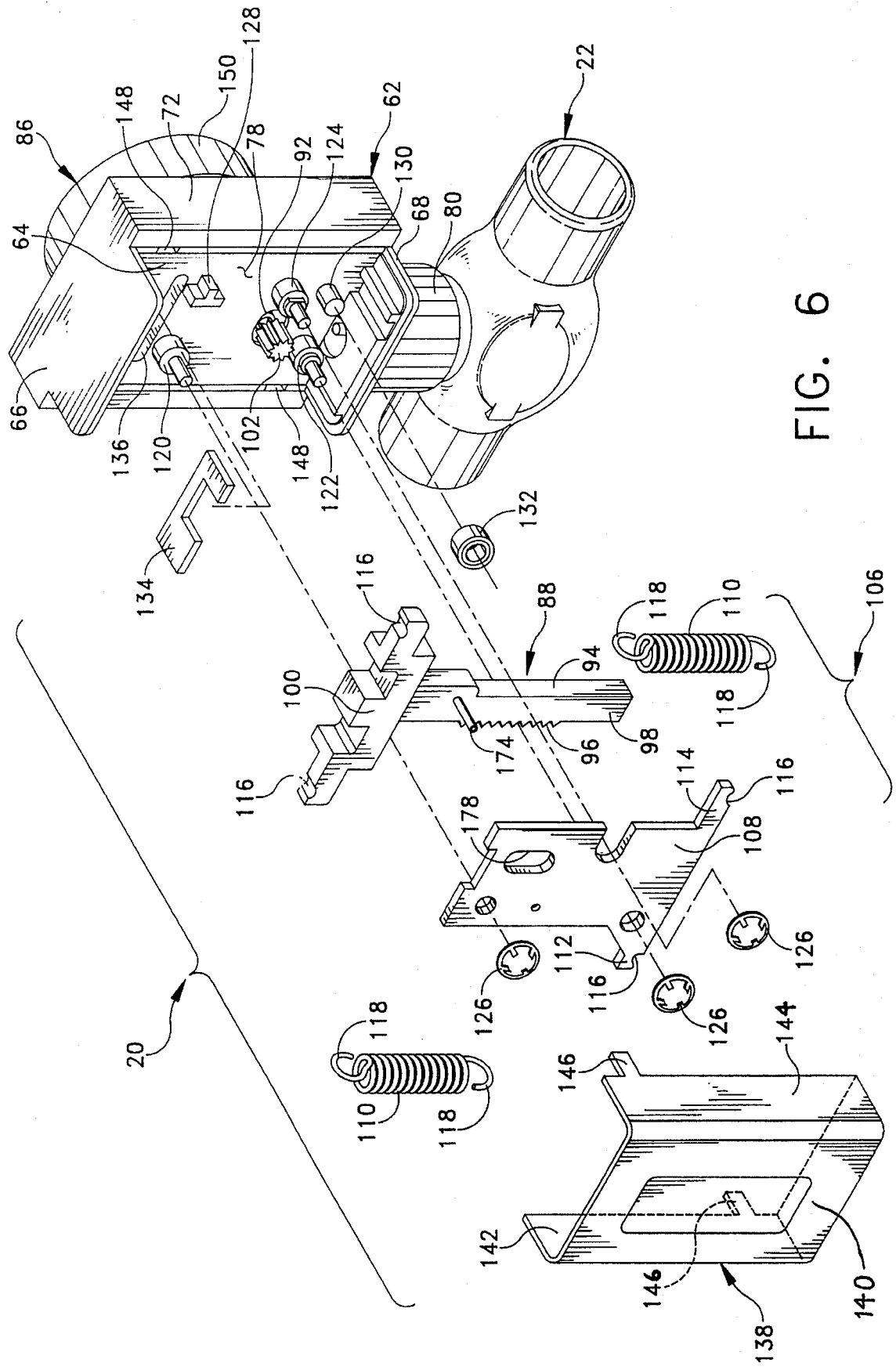
FIG. 6 is an exploded rear perspective view of the component parts of the valve actuating device.

Means, generally designated at 106, biases the rack 88 to its first position when the motor is deenergized, as best illustrated in FIGS. 4 and 5. More particularly, means 106 comprises a plate 108 mounted on the housing 62 and a pair of springs, each indicated at 110, attached to the cross member 100 of the rack 88 and to the plate 108. The plate 108 is fabricated from sheet metal material and includes a pair of lower, outwardly extending arms 112, 114 along with a plurality of openings and a slot formed therein for positioning and mounting the plate on the housing. For facilitating the attachment of the springs 110 to the cross member 100 of the rack 88 and the lower arms 112,114 of the plate 108, the cross member 100 and arms 112,114 each have a pair of notches at 116 formed therein, the pair of notches 116 in the cross member 100 facing away from the pair of notches 116 in the plate 108. The notches 116 are sized for receiving hooked end portions 118 of the springs 110 for securely retaining the springs 110 in a flexed condition to the rack 88 and the plate 108 for biasing the rack 88 downwardly. As illustrated in FIG. 6, the plate 108 is attached to the interior wall 64 of the housing 62 by three positioning members 120, 122 and 124 which extend perpendicularly from the second surface 78 of the wall 64. The positioning members 120, 122 and 124 have cylindrical extensions (not designated) formed to extend outwardly for receiving three retainers each indicated at 126, to retain the plate 108 in place.

This arrangement results in a space between the plate 108 and the interior wall 64 which receives the rack 88 within the space for securely positioning the rack therein. Positioning members 120, 122 are located on the left side of the bar 94 of the rack as illustrated in FIGS. 4 and 5 and positioning member 124 is located on the right side of the bar 94. For vertically orienting the rack 88 within the housing 62 along axis A and for prohibiting any lateral movement of the rack 88 while enabling its up-and-down movement, a fourth positioning member 130 having a rotatable bearing 132 mounted thereon is also provided. The fourth positioning member 130 exerts added pressure on the rack 88 so that the teeth 104 of the pinion gear 102 fully mesh with the teeth 96 of the rack 88. A T-shaped element 128 integrally formed with the interior wall 64 laterally stabilizes the rack 88 at the upper end of the bar 94.

Still referring to FIGS. 4 and 5, FIG. 4 illustrates the rack 88 in its first position in which the valve member 56 of the valve 22 is sealingly engaged with the valve seat 42 for blocking flow of fluid from the inlet 30 to the outlet 32. The downward force caused by springs 110, is greater than the upward force caused by spring 58 of the valve stem biasing means. Thus, the rack 88 is biased downwardly in its first position for maintaining the valve member 56 in its closed position. A resilient cushion 134 is mounted within a recess 136 formed in the interior wall 64 of the housing 62 for cushioning the impact between the downwardly facing surfaces of the cross member 100 of the rack 88 and the upper edges of the plate 108. This cushion 134 also prevents unwanted wear between the rack 88 and the plate 108. As illustrated in FIG. 6, the cushion 134 is shaped to receive the bar 94 of the rack 88 therein.

FIG. 5 illustrates the rack 88 in its second position after the motor 86 has been activated. More particularly, upon activation of the motor 86, the pinion gear 102 rotates counterclockwise for moving the rack 88 upwardly against the bias of springs 110. This action moves the end portion 98 of the bar 94 of the rack 88 away from the valve stem 54 of the valve 22. As the end portion 98 of the rack 88 moves away from the valve stem 54 of the valve 22, the spring 58 moves the valve stem 54 upwardly thereby moving the valve member 56 away from the valve seat 42 for allowing fluid to pass from the inlet 30 to the outlet 32 through opening 46. The motor 86 is preferably designed to rotate the pinion gear 102 at a speed which opens the valve 22 in approximately ten to twelve seconds; however, the motor can be designed to move the rack 88 at any speed, and not just the preferable speed set forth above. It should be noted that the motor 86 should produce a sufficient amount of torque to overcome the downward force caused by springs 110. So long as the motor 86 is energized, the rack 88 is maintained in its second position. When deenergized, the springs 110 move the rack 88 downwardly against the bias of the spring 58 of the valve to its first position. This should take approximately ten to twelve seconds.

Referring to FIGS. 2 and 6, a cover, generally designated 138, is releasably attachable to the housing for covering the rack 88 and means 106. The cover 138 is generally U-shaped in cross section and includes a rectangular wall 140 and two side walls 142, 144 which extend perpendicularly from the rectangular wall 140. Each side wall 142, 144 has an extension member 146 which lies along the same plane of its respective side wall. As shown, the extension members 146 are diagonally positioned with respect to each other and snugly received in slots 148 formed in the interior wall 64 of the housing 62 for securing the cover 138 to the housing 62. The cover 138 is preferably fabricated from aluminum or some other lightweight, rigid material. The cover 138, along with the top and bottom walls 66, 68 of the housing 62, fully encloses the internal components associated with the rack 88 and means 106 of the device 20.

Figure 7:
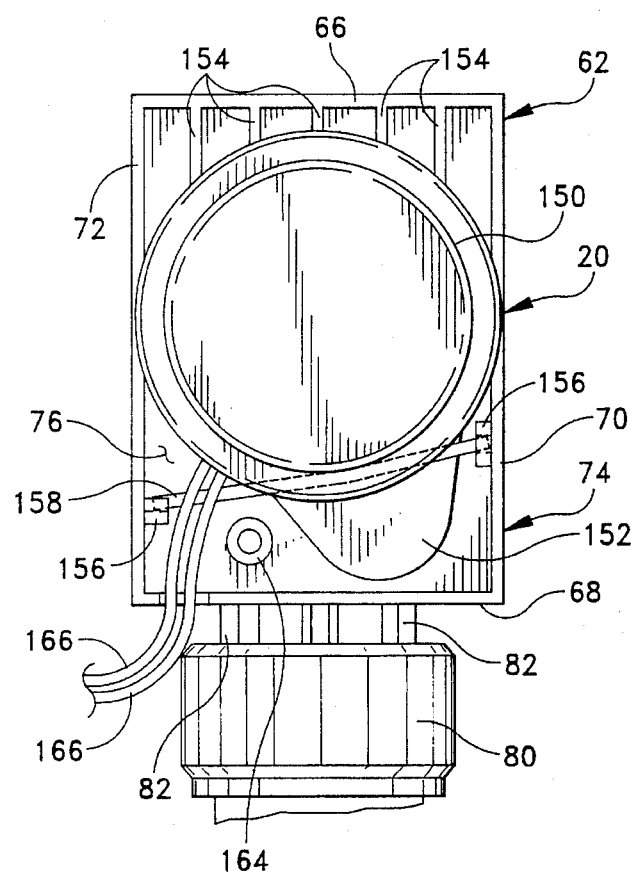
FIG. 7 is a partial, front elevational view of a motor of the valve actuating device.
Figure 8:
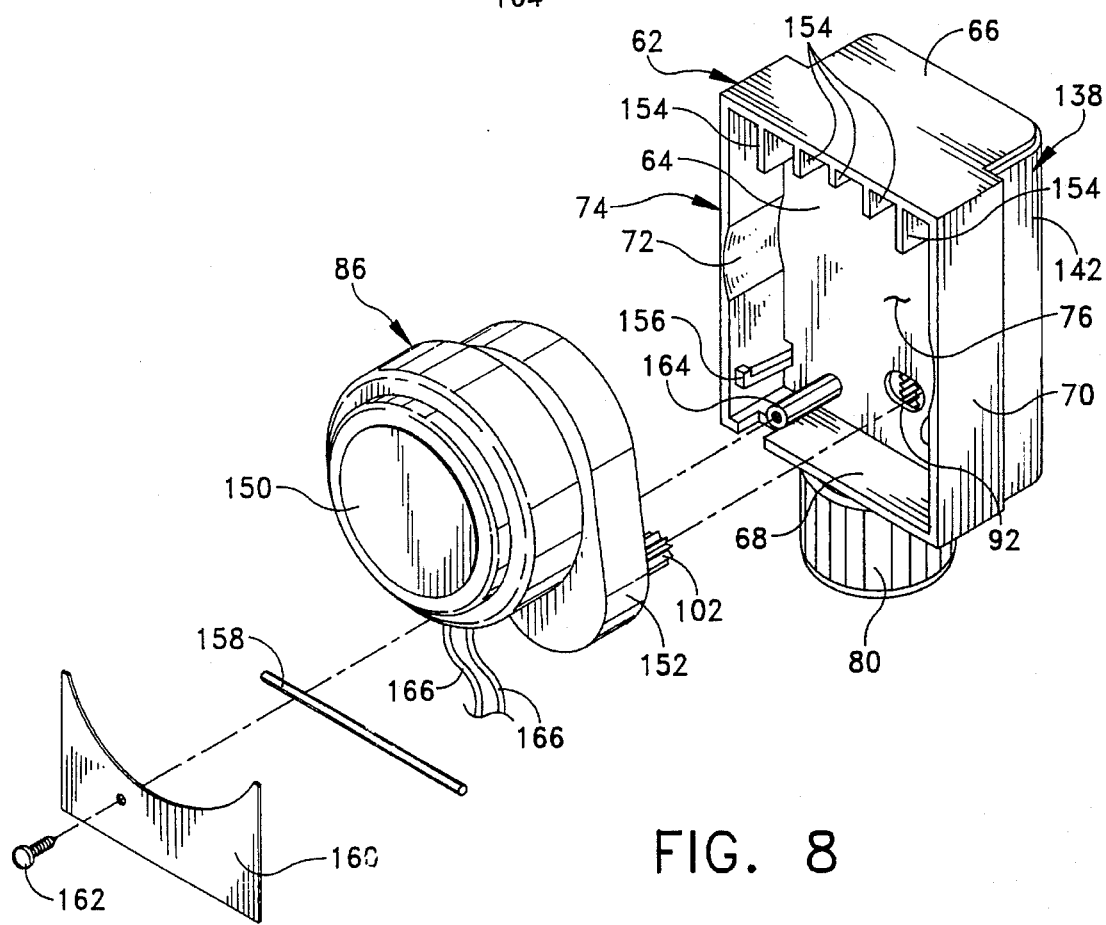
FIG. 8 is an exploded perspective view of the manner in which the motor is attached to a housing of the valve actuating device.

Referring now to FIGS. 7 and 8, the manner in which the motor 86 is attached to the housing 62 is illustrated in these drawings. The motor 86 comprises a cylindrical casing 150 which contains a power source (e.g., a coil) and a teardrop-shaped gear box casing 152 which contains necessary gearing to drive the shaft 90 and pinion gear 102. The outer peripheral wall 74 of the housing 62 is shaped for receiving the gear box casing 152 in a position in which the shaft 90 and pinion gear 102 extend through the opening 92 formed in the interior wall 64 of the housing 62. The housing 62 is formed with a plurality of web portions 154 having varying lengths for engaging the top of the cylindrical casing 150 of the motor 86. A pair of spring pin retaining formations, each indicated at 156, located on opposite side walls 70, 72 of the housing 62 receive ends of a spring pin 158 which is provided for securing the motor 86 to the housing 62. The ends of the spring pin 158 is deformable so that it resiliently engages the cylindrical housing 150 and the gear box casing 152 of the motor for securely retaining the motor 86 vertically and horizontally thereto as illustrated in FIG. 7. A plate 160 is mounted on the housing 62 underneath the cylindrical housing 150 of the motor 86 for covering the spring pin 158. This plate 160 is mounted on the housing 62 by a screw fastener 162 which is fastened to a sleeve 164 extending outwardly away from the first surface 76 of the interior wall 64 of the housing 62, the sleeve 164 having an opening (not designated) which is self-tapping for threadably engaging the screw fastener 162.

Figure 9:
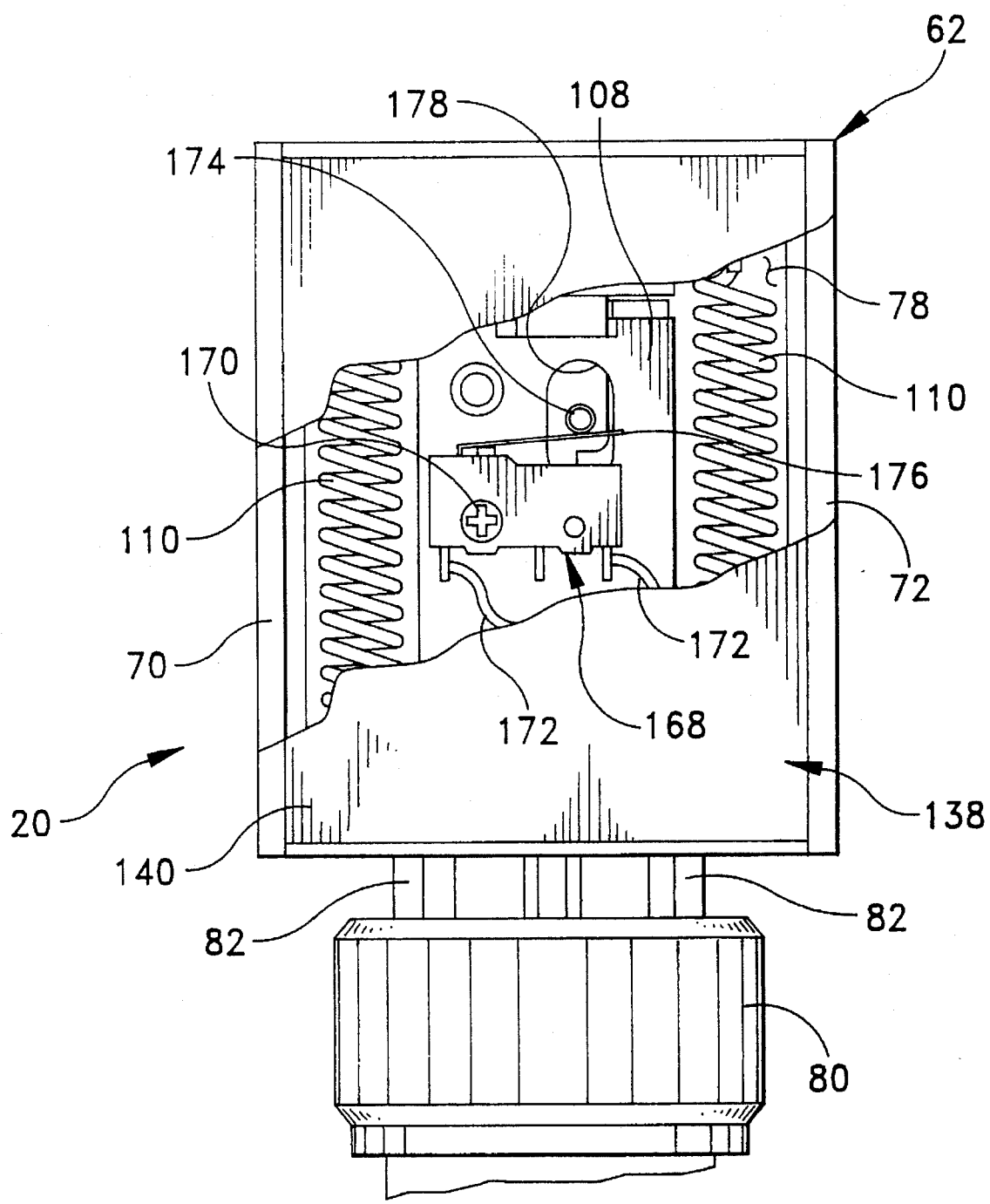
FIG. 9 is a rear elevational view of the valve actuating device with portions removed to illustrate a microswitch.

A pair of electrical wires each designated 166 are attached to the motor 86 for providing power to operate the motor 86. These wires 166 extend through a slot (not designated) provided in the bottom wall 68 of the housing 62 and are suitably connected to a control (not shown) of the system. The motor 86 of the device 20 is preferably designed to operate on 0.25 amps for a 24 volt motor. FIG. 9 illustrates a microswitch, generally designated 168, which may be mounted on the outwardly facing surface of the plate by a screw fastener 170. The microswitch 168 may be provided for signaling the activation and/or condition (i.e., whether the rack 88 is in its first or second position) of the valve actuating device 20 or for starting the operation of a furnace or pump, for example. Suitable wires 172 connect the microswitch 168 to the control. An outwardly extending cylindrical element 174 is provided for engaging a lever 176 of the microswitch 168 when the rack 88 is in its first downward position. As shown, the element 174 is mounted on the bar 94 of the rack 88 (as by welding) and extends through a slot 178 formed in the plate 108. Such a microswitch 168 should be compatible with electronic thermostats provided in a zone heating and/or cooling system for controlling the flow of fluid through the zones of the system.

In assembling the valve actuating device, the motor 86 is first attached to the housing 62 by inserting the gear box casing 152 of the motor 86 within the peripheral outer wall 74 of the housing 62 in a position in which the shaft 90 and pinion gear 102 extend through the opening 92 formed in the interior wall 64 of the housing 62. Next, the spring pin 158 is attached to the housing 62 such that its ends resiliently engage the retaining formations 156 of the outer wall 74 of the housing 62 and the middle portion of the spring pin 158 resiliently engages the cylindrical casing 150 to keep it in place with respect to the housing of the motor 86. The plate 160 is then mounted by the screw fastener 162 on the housing 62 in a position underneath the cylindrical casing 150 of the motor 86. The plate 160 is provided for covering the spring pin 158.

After attaching the motor 86 to the housing 62, the rack 88 and biasing means 106 is then assembled with the housing 62. First, the cushion 134 is inserted into the recess 136 and the annular bearing 132 is placed over positioning member 130. Next, the rack 88 is placed adjacent to the interior wall 64 in a position where it is between positioning members 120, 122 and positioning members 124, 130 and element 128, and the teeth 104 of the pinion gear 102 mesh with the teeth 96 formed on the bar 94 of the rack 88. The plate 108 is then placed over the rack 88 and secured to the interior wall 64 of the housing 62 by three retainers 126 which are received over the cylindrical extensions of the positioning members 120, 122 and 124 for securing the plate and rack in place. The springs 110 are then attached to the cross member 100 of the rack 88 and the arms 112, 114 of the plate 108 for biasing the rack 88 to its first position. After the rack 88 and means 106 are assembled, the cover 138 is then attached to the housing 62 for enclosing these components.

After assembling the device 20, it may then be threadably attached to the valve 22 in the manner set forth above. It should be noted that the valve 22 may be manually opened by threadably disengaging the device 20 from the valve 22 one or two turns for slightly raising the rack 88 away from the valve stem 54. This enables the valve stem biasing means 58 to move the valve member 56 away from the valve seat.

During operation, the valve 22 is normally closed. When a zone of the system calls for heat, for example, the valve 22 is opened in the following manner. Power is supplied to the motor 86 via wires 166 whereby the motor rotates the shaft 90 and pinion gear 102. The rotation of the pinion gear 102 moves the rack 88 of the device 20 linearly upwardly away from the valve stem 54. Prior to this movement, the end portion 98 of the rack 88 was in engagement with the valve stem 54 for maintaining the valve member 56 of the valve 22 in its closed position. Upon moving the rack 88 away from the valve stem 54, the spring 58 of the valve 22 moves the valve stem 54 and valve member 56 upwardly so that the valve member 56 disengages valve seat 42 and fluid is able to pass from the inlet 30 to the outlet 32 via opening 46. The motor 86 powers the movement of the rack 88 until its cross member 100 engages the top wall 66 of the housing 62. The motor 86 is a hysteresis synchronous motor which enables it to maintain its energized state for keeping the rack 88 in its second position without burning out. So long as the motor 86 is energized, the valve 22 will stay open. When the motor 86 is deenergized, the springs 110 force the rack 88 downwardly for closing the valve 22.

While there is shown and described herein certain specific structure embodying the invention, it will be manifest to those skilled in the art that various modifications and rearrangements of the parts may be made without departing from the spirit and scope of the underlying inventive concept and that the same is not limited to the particular forms herein shown and described except insofar as indicated by the scope of the appended claims.

What is claimed is:

1. A valve actuating device for opening and closing a valve of the type comprising a valve housing having an inlet, an outlet and a fitting receiving formation with an opening formed therein, a valve seat formed in the valve housing and disposed between the inlet and the outlet, a valve member sealingly engagable with the valve seat, and a valve stem attached to the valve member for moving the valve member between a closed position in which the valve member sealingly engages the valve seat for blocking the flow of fluid from the inlet to the outlet and an open position in which the valve member is spaced from the valve seat for allowing fluid to pass from the inlet to the outlet, said valve stem being biased by valve stem biasing means to maintain said valve member in its open position, said valve stem being extendable through the opening of the fitting receiving formation, said valve actuating device comprising:

a housing having a fitting which is threadably received by the fitting receiving formation of the valve for securing the housing to the valve;

a motor mounted on said housing, said motor being adapted to drive a shaft having a pinion gear upon the activation of the motor for opening the valve;

a rack having teeth engagable with the pinion gear of the motor, said rack having an end portion engagable with the valve stem of the valve, the arrangement being such that the rack is movable upon activation of the motor from a first position in which the end portion of the rack engages the valve stem for maintaining the valve stem in its closed position against the bias of said valve stem biasing means, to a second position in which, upon activation of the motor, the rack is moved via the pinion gear of the motor away from the valve stem thereby enabling said valve stem biasing means to move said valve member to its open position; and means biasing the rack to its first position.

2. A valve actuating device as set forth in claim 1, said rack having a cross member integrally formed with an end of the rack opposite said end portion engaging the valve stem, said means biasing the rack further comprising a plate mounted on said housing and a pair of springs attached to said cross member and said plate.

3. A valve actuating device as set forth in claim 2, said cross member and said plate each having a pair of notches formed therein, the pair of notches in the cross member facing away from the pair of notches in the plate, said notches being adapted to receive ends of said springs for biasing the rack to its first position.

4. A valve actuating device as set forth in claim 2, said housing having an interior wall having a first surface which engages said motor and a second surface engaging said rack, said rack being positioned between the interior wall and the plate for securely retaining the rack in the housing.

5. A valve actuating device as set forth in claim 4, said housing having a plurality of positioning members mounted on said interior wall and extending perpendicularly from the second surface of said interior wall, said positioning members positioning the plate with respect to the housing.

6. A valve actuating device as set forth in claim 5 comprising retainers attached to the positioning members for maintaining the rack and the plate in assembled relation with respect to the housing.

7. A valve actuating device as set forth in claim 4, said housing further having an outer peripheral wall attached to and extending outwardly away from the first surface at the periphery of said interior wall, said motor being adapted to engage the outer wall when mounting the motor on the housing.

8. A valve actuating device as set forth in claim 7, said motor being securely positioned within the outer wall of the housing by a spring pin having opposite ends which resiliently engage the outer wall and a middle portion which resiliently engages the motor.

9. A valve actuating device as set forth in claim 4, said interior wall having an opening formed therein for receiving the shaft of the motor therethrough.

10. A valve actuating device as set forth in claim 4 further comprising a cover releasably attachable to the housing for covering the rack and means for biasing the rack, said cover having a pair of diagonally positioned extension members which are snugly received in slots formed in the interior wall of the housing for securing the cover thereto.

11. A valve comprising:

a valve body connected to an inlet pipe and an outlet pipe of a zone heating and/or cooling system, said valve body comprising a valve housing having an inlet adapted to be connected to the inlet pipe, an outlet adapted to be connected to the outlet pipe, a fitting receiving formation with an opening formed therein, and a valve seat disposed between the inlet and the outlet, a valve member sealingly engagable with the valve seat, and a valve stem attached to the valve member for moving the valve member between a closed position in which the valve member sealingly engages the valve seat for blocking the flow of fluid from the inlet to the outlet and an open position in which the valve member is spaced from the valve seat for allowing fluid to pass from the inlet to the outlet, said valve stem being biased by valve stem biasing means to maintain said valve member in its open position, said valve stem being extendable through the opening of the fitting receiving formation; and a valve actuating device for controlling the opening and closing of the valve body, said device comprising a housing having a fitting which is threadably received by the fitting receiving formation of the valve body for securing the housing to the valve body, an electric motor mounted on said housing, said motor being adapted to drive a shaft having a pinion gear upon its activation for opening the valve body, a rack having teeth engagable with the pinion gear of the electric motor, said rack having an end portion engagable with the valve stem of the valve body, the arrangement being such that the rack is movable upon activation of the motor from a first position in which the end portion of the rack engages the valve stem for maintaining the valve stem in its closed position against said valve stem biasing means, to a second position in which the rack is moved via the pinion gear of the motor away from the valve stem thereby enabling said valve stem biasing means to move said valve stem to its open position, and means biasing the rack to its first position.

12. A valve as set forth in claim 11, said rack having a cross member integrally formed with an end of the rack opposite said end portion engaging the valve stem, said means biasing the rack further comprising a plate mounted on said housing and a pair of springs attached to said cross member and said plate.

13. A valve as set forth in claim 12, said cross member and said plate each having a pair of notches formed therein, the pair of notches in the cross member facing away from the pair of notches in the plate, said notches being adapted to receive ends of said springs for biasing the rack to its first position.

14. A valve as set forth in claim 12, said housing having an interior wall having a first surface which engages said motor and a second surface engaging said rack, said rack being positioned between the interior wall and the plate for securely retaining the rack in the housing.

15. A valve as set forth in claim 14, said housing having a plurality of positioning members mounted on said interior wall and extending perpendicularly from the second surface of said interior wall, said positioning members positioning the plate with respect to the housing.

16. A valve as set forth in claim 15 comprising three retainers attached to the positioning members for maintaining the rack and the plate in assembled relation with respect to the housing.

17. A valve as set forth in claim 14, said housing further having an outer peripheral wall attached to and extending outwardly away from the first surface at the periphery of said interior wall, said motor being adapted to engage the outer wall when mounting the motor on the housing.

18. A valve as set forth in claim 17, said motor being securely positioned within the outer wall of the housing by a spring pin having opposite ends which resiliently engage the outer wall and a middle portion which resiliently engages the motor.

19. A valve as set forth in claim 14, said interior wall having an opening formed therein for receiving the shaft of the motor therethrough.

20. A valve as set forth in claim 14 further comprising a cover releasably attachable to the housing for covering the rack and means for biasing the rack, said cover having a pair of diagonally positioned extension members which are snugly received in slots formed in the interior wall of the housing for securing the cover thereto.

* * * * *